United States Patent Office 3,393,177
Patented July 16, 1968

3,393,177
MANUFACTURE OF ISOCYANATE REACTION PRODUCTS FROM A MIXTURE OF AN ORGANIC DIISOCYANATE, AN ALIPHATIC GLYCOL, AND A MONOHYDRIC PHENOL
Dorothy Joyce Guest, Arthur Lowe, and Brian Arthur Mountfield, Manchester, England, assignors to Imperial Chemical Industries Limited, London, England, a corporation of Great Britain
No Drawing. Filed June 17, 1966, Ser. No. 558,272
Claims priority, application Great Britain, June 24, 1965, 26,819/65
3 Claims. (Cl. 260—47)

ABSTRACT OF THE DISCLOSURE

A process for the manufacture of an isocyanate reaction product containing thermally labile urethane groups, which comprises reacting together a mixture of an organic diisocyanate, at least one compound containing at least two alcoholic hydroxyl groups and a phenol, the said mixture containing approximately one alcoholic hydroxyl group and between 2 and 10 phenolic hydroxyl groups for each molecule of diisocyanate present. By employing in the reaction mixture an amount of the phenol which is considerably in excess of that required to contribute one phenolic hydroxyl group for each molecule of diisocyanate present, it is possible by varying the reaction conditions to control the characteristics of the blocked isocyanate obtained in a useful manner.

DISCLOSURE

This invention relates to the manufacture of solutions of "blocked" isocyanate compositions which are of value in the production of surface coatings.

The use of blocked isocyanates as intermediates for the production of urethane surface coatings is well known. Blocked isocyanates, sometimes also called "masked" or "capped" isocyanates, are the reaction products of isocyanates with certain types of compound containing active hydrogen, which contain no free isocyanate groups under normal conditions but which have the property of disassociating at elevated temperatures into their original components. Examples of active hydrogen-containing compounds which are commonly used in the manufacture of blocked isocyanates include acetoacetic ester, malonic ester, cyclohexanone oxime and, in particular, phenols. Thus when an isocyanate is reacted with an equivalent amount of a phenol, a phenyl urethane is formed. At normal temperatures such a compound exhibits none of the characteristic reactions of the isocyanate group towards moisture or hydroxyl group-containing compounds, but on heating to a temperature in the region of 125–200° C., it breaks down to give the original phenol and isocyanate, and the latter may then react irreversibly with a compound containing aliphatic hydroxyl groups to give a urethane in the normal manner. In practice, in surface coating applications, the blocked isocyanate is derived from a polyisocyanate having at least two isocyanate groups, in particular from a branched polyisocyanate obtained by reacting an excess of a diisocyanate with one or more aliphatic polyhydroxy compounds. If a blocked polyisocyanate of this type is mixed with a hydroxyl group-containing polymer, for example a polyester, no reaction occurs at normal temperatures but on heating the phenol is liberated and a cross-linked polymer is formed. Such a process is of particular value in the production of high temperature stoving lacquers such as wire enamels.

In manufacturing a blocked polyisocyanate from a phenol and an isocyanate-ended reaction product of a diisocyanate and an aliphatic polyhydroxy compound, or a mixture of such compounds, it is not essential to react this with the phenol in a second step; the process may be carried out with considerably more convenience by reacting the diisocyanate, the polyhydroxy compound or compounds and the phenol directly together in a single stage. The reactants are heated together under conditions such that substantially all the isocyanate groups present are reacted; on cooling, the blocked polyisocyanate is obtained, usually in the form of a brittle solid. For use as a surface coating intermediate, it is then necessary to convert this product into a finely divided form by grinding and then to dissolve it in a suitable volatile solvent, so that it may conveniently be blended with a hydroxyl group-containing polymer to form a storage-stable lacquer. The lacquer is subsequently applied to wire or any other desired substrate and is finally cured by stoving. The operations of grinding and dissolving the blocked isocyanate in a solvent are troublesome and may be avoided by carrying out the reaction between the diisocyanate, the polyhydroxy compound and the phenol in the presence of the solvent; solvents which are used for this purpose are, for example, ethyl acetate, butyl acetate or methyl isobutyl ketone. This procedure not only has the advantage of yielding the blocked diisocyanate in a form which is easily discharged from the reaction vessel and is convenient for subsequent handling, but it also tends to minimise the formation of insoluble by-products which is a feature of the process when carried out in the absence of solvent.

According to these known single-stage methods for manufacturing blocked isocyanates, the proportions of the reactants are selected in such a way that there are present in the reaction mixture approximately one alcoholic hydroxyl group and slightly more than one phenolic hydroxyl group for each molecule of diisocyanate. These proportions are sufficient to ensure that no free isocyanate groups remain in the product after completion of the heating period. During the heating process, two main reactions take place: (a) formation of aromatic urethane groups by reaction of isocyanate groups with phenolic hydroxyl groups; (b) formation of aliphatic urethane groups by reaction of isocyanate groups with alcoholic hydroxyl groups. As discussed above, the urethane groups produced by reaction (a) are thermally labile and are responsible for the properties of the product as a curing agent; these may conveniently be regarded as 'latent' isocyanate groups. Reaction (b) gives rise to urethane groups which are not thermally labile and which participate in chain-extension and (when the reaction mixture contains a compound having three or more aliphatic hydroxyl groups) branching in the product. These two reactions take place at different rates, but owing to the approximate overall equivalence of isocyanate groups and hydroxyl groups in the reaction mixture, the relative proportion of aromatic urethane groups to aliphatic urethane groups, and (in appropriate cases) the degree of branching, in the product are fixed. There is thus no means whereby the "latent" isocyanate group content of the product may be controlled once the actual reactants have been selected.

It has now been found, however, that by employing in the reaction mixture an amount of the phenol which is considerably in excess of that required to contribute one phenolic hydroxyl group for each molecule of diisocyanate present, it is possible by varying the reaction conditions to control the characteristics of the blocked isocyanate obtained in a useful manner.

Thus according to the present invention there is provided a process for the manufacture of an isocyanate reaction product containing thermally labile urethane groups, which comprises reacting together a mixture of an organic diisocyanate, a least one compound containing at least two alcoholic hydroxyl groups and a phenol, the said mixture containing approximately one alcoholic hydroxyl group and between 2 and 10 phenolic hydroxyl groups for each molecule of diisocyanate present.

Suitable organic diisocyanates for use in the process of the invention include, for example, aliphatic diisocynates such as hexamethylene diisocyanate, cycloaliphatic diisocyanates such as methylcyclohexane diisocyanate and dicyclohexylmethane diisocyanate and aromatic diisocyanates such as m- and p-phenylene diisocyanate, chlorophenylene 2,4 - diisocyanate, tolylene 2,4-diisocyanate, tolylene 2,6-diisocyanate, diphenylmethane 4,4′-diisocyanate, 3-methyldiphenylmethane 4,4′-diisocyanate, diphenyl 4,4′-diisocyanate, diphenyl ether diisocyanate, 4,4′-diisocyanate-3,3′-dimethyl diphenyl and naphthalene 1,5-diisocyanate. Mixtures of diisocyanates may also be used. Preferred diisocyanates are tolylene 2,4- and 2,6-diisocyanates and mixtures thereof, diphenylmethane 4,4′-diisocyanate and hexamethylene diisocyanate.

Suitable aliphatic compounds containing at least two hydroxyl groups include, for example, glycols such as ethylene glycol, 1,2-propylene glycol, 1,3-butylene glycol, 1,4-butylene glycol, pentane-1,5-diol, neopentyl glycol, hexan-1,6-diol, decan-1,10-diol, diethylene glycol and dipropylene glycol, trihydric alcohols such as glycerol, trimethylolpropane, trimethylolethane and hexanetriol and compounds containing more than three hydroxyl groups such as pentaerythritol. Preferred aliphatic hydroxy compounds are ethylene glycol, diethylene glycol, 1,2-propylene glycol, 1,3- and 1,4-butylene glycols, glycerols and trimethylolpropane.

Suitable phenols for use in the process of the present invention include, for example, phenol itself, m- and p-cresol, the xylenols and cresylic acid; mixtures of phenols may be used. Preferred phenols are the cresols and the xylenols, including the commercially-obtainable mixture of isomers solds as "10° xylenol."

It will be apparent that by employing a considerable excess of phenol in the reaction mixture, the phenol functions as both reactant and solvent. By virtue of the unreacted phenol remaining in the product, the blocked isocyanate is obtained in a liquid form which is readily handled and incorporated into lacquer compositions. When such a composition is heated to effect curing, the excess of phenol is volatilised together with the phenol which is split off during the dissociation of the aromatic urethane groups.

The reaction conditions which may be varied in order to control the characteristics of the blocked isocyanate are, principally, reaction temperature and the order and relative speed of addition to the diisocyanate of the aliphatic and aromatic hydroxy compounds respectively. The reaction temperature may in general lie in the range of from 100° to 200° C., preferably from 120° to 170° C.

It has been found that under the reaction conditions prevailing in the process of the present invention, that is, with a preponderance of phenolic hydroxyl groups over aliphatic hydroxyl groups, temperatures in the lower part of this range tend to favour the formation of aromatic urethane groups merely because any given isocyanate group is statistically more likely to encounter and react with a phenolic hydroxyl group than an aliphatic hydroxyl group, and consequently products having high latent isocyanate group contents are obtained. At higher temperatures the formation of aliphatic urethane groups predominates in spite of the excess of phenolic component because of the thermal dissociation of the aromatic urethanes which have been formed at lower temperatures, with consequent release of free isocyanate groups which are then available for irreversible reaction with aliphatic hydroxyl groups. Thus products having a lower latent isocyanate group content are obtained.

If the whole of the phenolic reactant is added to the diisocyanate before the aliphatic hydroxy compound or mixture of such compounds is added, the product is found to a have a high latent isocyanate group content, but when the mixture is heated above the temperature at which dissociation of the aromatic urethane compounds into the original phenol and isocyanate groups occurs, then the irreversible reaction between isocyanate and aliphatic hydroxy group commences and the latent isocyanate content of the product gradually falls.

On the other hand if the addition of the phenol is delayed until a substantial part of the aliphatic hydroxy compound or compounds has been added, a product having a lower latent isocyanate group content is obtained at an early stage in the reaction. (It is generally undesirable to delay adding the phenol until all of the aliphatic hydroxy compound or compounds has been added, since this may lead to the formation of the insoluble intermediate products which do not readily redissolve in the phenol.)

The process of the reaction may be carried out by adding the aliphatic hydroxy compound or mixture of compounds to a mixture of the diisocyanate and the whole of the phenolic component previously heated to the desired temperature, of alternatively, a mixture of the whole of the aliphatic and phenolic components may be added to the already heated diisocyanate.

In a variant of the reaction conditions only a part of the total phenolic component is added initially to the diisocyanate and the remainder is added together with the aliphatic hydroxyl compound or mixture of compounds.

In a further variant part of the phenolic component may be withheld from the reaction until the reaction between the diisocyanate, aliphatic hydroxyl compound and remaining phenolic component is substantially complete and is then added whilst the reaction mixture is still molten.

It has been found that particularly useful products are obtained by reacting the diisocyanate, the aliphatic hydroxyl compound or mixture of compounds and the whole of the phenol together at approximately 140° C. under one of the sets of conditions described above, followed by a further period of heating at approximately 160° C.

A second preferred process comprises reacting together at approximately 140° C. the diisocyanate, the aliphatic hydroxyl compound or mixture of compounds and from at least 1 mol of the phenolic compound per mol of diisocyanate to 50% by weight, taken from the total quantity of phenolic compound which is to be used in the process, and when the reaction is substantially complete, adding the remainder of the phenolic compound to the product while it is still molten and blending until a homogeneous solution is obtained. If desired, the reaction mixture may contain in addition to the reactants already specified an inert solvent such as an ester or a ketone. Such additional solvents are not normally necessary, however, and when they are used they should be selected so as not to place any limitation on the range of reaction conditions which may be employed (for example, by reason of their boiling points).

The latent isocyanate group content of a blocked polyisocyanate obtained by the process of the present invention may be determined by a modification of the procedure well known in the art for determining free isocyanate groups, in which the compound to be analysed is reacted at room temperature with a known excess of dibutylamine and the unreacted amine is then estimated by titration with standard mineral acid. The modification of the normal procedure consists in allowing the blocked polyisocyanate to stand in contact with the dibutylamine for a sufficient length of time (usually several hours) to ensure that all the phenyl urethane groups present are able to break down and react with the amine.

The solutions of blocked polyisocyanates obtained by the process of the present invention may be utilised in the production of urethane surface coatings according to any of the methods known in the art. Thus the solution of blocked polyisocyanate may be blended to form a lacquer with a branched polyester resin, such as a resin obtained by condensation of a mixture of dihydric and/or polyhydric alcohols and a dicarboxylic acid; although it is not normally necessary, other solvents such as butyl acetate, 2-ethoxyethyl acetate, methyl ethyl ketone or methyl isobutyl ketone may if desired be added at the same time. The lacquer so obtained is applied to the chosen substrate by any of the known methods such as brushing, dipping, flowing or spraying and the coating is then cured by stoving at a temperature which may lie in the range of from 150° C. to 350° C., for a time which may vary from 1 hour to as short a period as 15 seconds, depending on the curing temperature employed. As stated above, coating compositions incorporating the blocked polyisocyanates of the present invention are particularly valuable as wire enamels, but they may also be used successfully on other metal substrates and on rubber, glass and synthetic textile materials. The coatings so obtained have excellent resistance to abrasion and to attack by organic solvents and inorganic acids and alkalis.

The invention is illustrated but not limited by the following examples in which parts are by weight:

Example 1

Into a vessel fitted with an agitator, thermometer, reflux condenser, graduated measure vessel and inlet for dry inert gas ($N_2$), and heated by means of an oil jacket, are charged 200 parts of tolylene diisocyanate (2,4:2,6 isomers in the ratio 80:20) and 0.06 part of benzoyl chloride. The temperature of the contents of the vessel is taken to 145° C. (with agitation and under an inert atmosphere) and there is then added from the measure vessel a mixture of 23 parts of glycerol, 21.2 parts of diethylene glycol and 525 parts of "10° xylenol." This addition is made at a steady rate over 2 hours with the temperature of the contents of the vessel held at 145° C. Thereafter the temperature is raised to 160° C. (during ca. ½ hour) and held there for 2 hours. The product is then cooled to room temperature to give a solution of blocked polyisocyanate having the following characteristics:

"Latent" NCO group content (i.e. NCO combined as aromatic urethane): 6.1%.
Viscosity at 25° C.: 568 stokes
Examinations by infrared spectroscopy reveals no free—NCO groups in the product.

Example 2

Using the equipment described in Example 1 there is charged to the vessel 200 parts of tolylene diisocyanate (2,4:2,6-isomers in the ratio 80:20) 525 parts of "10° xylenol" and 0.06 part of benzoyl chloride, and the temperature of this mixture is raised to 145° C. There is then added, over 2 hours and at a steady rate, a mixture of 23 parts of glycerol and 21.2 parts of diethylene glycol, with the temperature held at 145° C. Subsequently the temperature is maintained at 145° C. for a further 4 hours.

The product has a "latent" NCO group content of 7.4% and a viscosity at 25° C. of 631 stokes.

Example 3

The procedure of Example 2 is repeated with the difference that, when the glycerol/diethylene glycol addition is complete, the temperature of the contents of the vessel is raised to 160° C. and held at that temperature for 2 hours. The product has a "latent" NCO group content of 6.7% and a viscosity at 25° C. of 506 stokes.

Example 4

Into a vessel equipped as in the previous examples, are charged 200 parts of tolylene diisocyanate (2,4:2,6 isomers in the ratio 80:20), 140 parts of "10° xylenol" and 0.06 part of benzoyl chloride. The temperature of the contents of the vessel is raised to 145° C. and there is then added, during 2 hours and at a steady rate, a mixture of 23 parts of glycerol and 21.2 parts of diethylene glycol. The temperature is then raised to 160° C. during 30 minutes and maintained there for a further 2 hours. The product is then cooled to ca. 100° C. and there is added 385 parts of xylenol. It is necessary to stir the batch for ca. 2 hours and to raise the temperature to 140° C. in order to obtain a homogeneous solution in the xylenol.

The product has a "latent" NCO group content of 5.1% and a viscosity at 25° C. of 442 stokes.

Example 5

A homogeneous solution of 44.4 parts of diethylene glycol, 48.3 parts of glycerol and 2193 parts of cresylic acid is added with stirring to 420 parts of tolylene diisocyanate (2,4:2,6 isomers in the ratio 80:20) containing 0.18 part of benzoyl chloride, previously heated to 140° C. The addition occupies 2 hours and the temperature is maintained at 140–145° C. The temperature is thereafter raised to 160° C. and maintained at 160–165° C. for 2 hours. On cooling, a solution in cresylic acid of a blocked polyisocyanate is obtained.

Example 6

1050 parts of tolylene diisocyanate (80:20 mixture of the 2,4:2,6 isomers) are charged to a vessel fitted as described in Example 1; 0.5 part of benzoyl chloride is added. The temperature of the contents of the vessel is raised to 145° C. and there is then added from the measure vessel, during 2 hours (with stirring and under an atmosphere of dry $N_2$), a mixture of 2600 parts of a commercial cresylic acid containing 52–55% of m-cresol, 121 parts of glycerol and 111 parts of diethylene glycol. The temperature of the reaction mixture is then raised to 160° C. and maintained thereat for 2 hours. The product is cooled to 60° C. and discharged.

The resuting solution of blocked polyisocyanate has a viscosity, at 25° C.) of 180 stokes and a "latent" NCO group content of 6.1%.

Example 7

210 parts of tolylene diisocyanate (80:20 mixture of the 2,4:2,6 isomers) is charged to a vessel fitted as described in the previous examples; 0.1 part of benzoyl chloride is added. The temperature of the tolylene diisocyanate is raised to 145° C. and there is added from the measure vessel (with stirring and under an atmosphere of dry $N_2$) a mixture of 520 parts of phenol, 24.2 parts of glycerol and 22.2 parts of diethylene glycol. When the addition is complete the temperature of the contents of the vessel is raised to 160° C., at which it is maintained for a further 2 hours. The product is then cooled. It has a "latent" NCO group content of 6.3% and a viscosity (at 25° C.) of 35.6 stokes.

Example 8

The following example shows how the latent isocyanate value and the viscosity of the product may be changed by prolonged heating at different temperatures or by adjusting the mode of addition of the phenolic component in systems of the type described by the invention.

Into a reaction vessel, equipped as described in the previous examples, is charged 1050 parts of tolylene diisocyanate 2,4:2,6 isomers in the ratio 80:20, and 0.5 part of benzoyl chloride. The temperature is raised to 140° C. and there is added, during 2 hours, a mixture of 2600 parts of m-cresol, 121 parts of glycerol and 111 parts of diethylene glycol. When these additions are completed the temperature of the contents of the vessel is held at 140 °C. for a further 5½ hours. During this time samples are withdrawn and the viscosity and the latent "NCO" content of these are measured. The results obtained are shown in the following table:

| Length of time at 140° C. after the completion of addition of the reactants (hours) | Latent "NCO" (percent) | Viscosity (stokes) |
| --- | --- | --- |
| 0 | 8.3 | 126 |
| 1 | 7.1 | 149 |
| 2 | 6.5 | 183 |
| 3½ | 6.2 | 183 |
| 5½ | 6.0 | 184 |

If, however, the above quantities are used in a similar batch heated to 160 C. instead of 140° after the completion of additions the results are as follows:

| Length of time at 140° C. after the completion of addition of the reactants (hours) | Latent "NCO" (percent) | Viscosity (stokes) |
| --- | --- | --- |
| 0 | 7.1 | 153 |
| 2 | 5.7 | 176 |

If alternatively the reaction is done at 140 C. throughout but half the m-cresol is held back and merely used as a diluent at the end of the reaction the following results are obtained:

| Length of time at 140° C. after the completion of addition of the reactants (hours) | Latent "NCO" (percent) | Viscosity (stokes) |
| --- | --- | --- |
| 0 | 6.9 | 159 |
| 1 | 5.6 | 245 |
| 2 | 5.85 | 261 |
| 3½ | 5.75 | 199 |
| 5½ | 5.65 | 147 |

We claim:
1. A process for the manufacture of an isocyanate reaction product containing thermally labile urethane groups which comprises heating together at a temperature within the range of 100° C. to 200° C. a mixture of an organic diisocyanate, at least one aliphatic compound containing at least two hydroxyl groups and a monohydric phenol which is volatile at 350° C., the said mixture having an aliphatic OH:NCO ratio of about 0.5:1 and a phenolic OH:NCO ratio of from 1:1 to 5:1.

2. A process as claimed in claim 1, wherein the reaction between the diisocyanate, the aliphatic hydroxyl compound or mixture of compounds and the whole of the phenol is carried out initially at approximately 140° C. and completed by a further period of heating at approximately 160° C.

3. A process as claimed in claim 1, wherein the diisocyanate, the aliphatic hydroxyl compound or mixture of compounds and from at least one mol. of the phenolic compound per mol. of diisocyanate to 50% by weight, taken from the total quantity of phenolic compound which is to be used in the process, are reacted together at approximately 140° C. and when the reaction is substantially complete, adding the remainder of the phenolic compound to the product while it is still molten and blending until a homogeneous solution is obtained.

References Cited
UNITED STATES PATENTS 3,183,112   5/1965   Gemassmer _____ 106—316
3,250,745   5/1966   Davis et al. _____ 260—47

WILLIAM H. SHORT, *Primary Examiner.*

L. LEE, *Assistant Examiner.*